(12) United States Patent
Ruppelt et al.

(10) Patent No.: US 7,246,087 B1
(45) Date of Patent: Jul. 17, 2007

(54) METHOD AND APPARATUS FOR PRODUCT SELECTION ASSISTANCE

(75) Inventors: Kevin Michael Ruppelt, Louisville, KY (US); Leslie A. Curran, Louisville, KY (US); Martha Mayer Davis, Louisville, KY (US); Jane Wallace Schneider, Prospect, KY (US); Ellen Diane Evans, Prospect, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/480,344

(22) Filed: Jan. 10, 2000

(51) Int. Cl.
 $G06Q\ 30/00$   (2006.01)
(52) U.S. Cl. .......................................... 705/27; 705/26
(58) Field of Classification Search ................. 705/26, 705/27
 See application file for complete search history.

(56) References Cited

U.S. PATENT DOCUMENTS

| | | | |
|---|---|---|---|
| 4,992,940 A | | 2/1991 | Dworkin |
| 5,737,414 A | | 4/1998 | Walker et al. |
| 5,754,850 A | * | 5/1998 | Janssen ................... 707/104.1 |
| 5,794,207 A | | 8/1998 | Walker et al. |
| 5,797,127 A | | 8/1998 | Walker et al. |
| 5,798,508 A | | 8/1998 | Walker et al. |
| 5,842,178 A | | 11/1998 | Giovannoli |
| 5,884,274 A | | 3/1999 | Walker et al. |
| 6,012,051 A | * | 1/2000 | Sammon et al. .............. 706/52 |
| 6,035,283 A | * | 3/2000 | Rofrano ........................ 705/27 |
| 6,167,383 A | * | 12/2000 | Henson ........................ 705/26 |
| 6,507,824 B1 | * | 1/2003 | Yon et al. ..................... 705/26 |
| 2001/0049631 A1 | * | 12/2001 | Watts et al. .................. 705/26 |
| 2005/0171947 A1 | * | 8/2005 | Gautestad ...................... 707/5 |

OTHER PUBLICATIONS

"Calico Technology: Concinity configuration/quotation system" (Teresko, John et al. Dec. 15, 1996. Industry Week).*
"With nine Shopping Days Till Christmas, ShopAround.com Helps Last Minute E-Shoppers Find the Right gift for the Right Price" (Dec. 14, 1999, Business Wire).*
"Casting their nets on the WWW" (Jones, Kevin. Nov. 1996, Electrical Apparatus).*
"Creating Your Web Site" (Frieswick, Kris. Apr. 1997. Industrial Distribution).*
"More distributors set up shop on the WWW" (Gardner, Fred. 1997. Electronic Business Today).*
"A services-Marketing perspective on e-retailing: implications for e-retailers and directions for further research" Kolesar, Mark. 2000. Internet Research).*

(Continued)

*Primary Examiner*—Nicholas D. Rosen
(74) *Attorney, Agent, or Firm*—George L. Rideout, Esq.; Armstrong Teasdale, LLP

(57) ABSTRACT

A method for product selection assistance includes receiving a product category selection, matching the product category selection against a product database to determine a plurality of matched products, and displaying a product matrix. The product matrix includes a product entry for each of the matched products. The product entries include a model identifier, a model price, and at least one product configuration parameter associated with the matched products. The method also includes presenting a product configuration question, receiving a product configuration answer, and responsively updating the product matrix based on the product configuration answer to eliminate at least one product entry in the product matrix.

38 Claims, 4 Drawing Sheets

OTHER PUBLICATIONS

Product search in e-shopping: a review and research propositions (Rowley, Jennifer. 2000. The Journal of Consumer Marketing).*
Shopping bots: Intelligent shopper or virtual department store? (Rowley, Jennifer. 2000. International Journal of Retail and Distribution Management).*
Pages from www.grainger.com excised using web.archive.org—Jul. 7, 1997 ("Catalog How To", "Catalog Tips", "Browse/Order Mode").*
"Raychem intros sourcing site" (Trommer, Diane. Mar. 16, 1998. Electronic Buyers' News).*
"Manufacturing Marketplace opens for business on the WWW" (Nov. 18, 1996. Design News).*
Pages from www.Whirlpool.com.*
Pages from www.frigidaire.com.*
Pages from www.kenmore.com.*
Pages from www.maytag.com.*
"4 Solutions to rev up your e-commerce business" (Hoffman, Richard. Dec. 15, 1998. Network Computing).*
"Casting their nets on the World wide Web" (Jones, Kevin. Nov. 1996. Electrical Apparatus).*
"Soliloquy Announces Chatterbot Stategy to Humanize E-commerce" May 11, 1999. Press release).*
"EETimes Guide to internet Engineering" (Lange, Larry. Jul. 6, 1998. Electronic Engineering Times).*
"Intel Launches Java-based Internet Design Tool" (Lange. Larry. Jan. 5, 1998. Electronic Engineering Times).*
"Millstar creates on-line catalog for hoffman enclosures" (Nov. 5, 1999. Business wire).*
"Calico Technology: Concinity configuration/quotation system" Teresko, John et al. Dec. 16, 1996. industry Week).*
"Suite for Web-selling guides customers" (Sweat, Jeff. Jan. 28, 1999. InformationWeek).*
"pcOrder.com to Provide computer Product content to Yahoo! Shopping Consumers" Dec. 8, 1999. PR Newswire.*
Anon., "Ask Jeeves and AltaVista Partner: Natural Language Question-Answering Capability Enhances Leading Search Service," Business Wire, p. 67, Oct. 13, 1998.*
www2.applianceorder.com/finder, Appliance Finder web pages, printed Oct. 12, 1999, date and aurthor unknown, 1 page.
www.comparenet.com. CompareNet Category List web pages, printed Aug. 30, 1999, date and author unknown, 3 pages.
www.comparenet.com, CompareNet web pages, printed Oct. 12, 1999, date and author unknown, 4 pages.
www.whirlpool.com, Whirlpool Internet Shopping Assitant web pages, printed Oct. 12, 1999, date and author unknown, 2 pages.
www.kitchenaid.com, KitchenAid Virtual Valet web pages, printed Oct. 12, 1999, date and author unknown, 3 pages.
www.kitchenaid.com, Assisted Shopping web pages, printed Aug. 23, 1999, date and author unknown, 5 pages.
shop.homeappliances.com, HomeAppliances web pages, printed Aug. 10, 1999, date and author unknown, 5 pages.
www.sears.com, Shop for Appliances, Tools, and Parts web pages, printed Sep. 1, 1999, date and author unknown, 6 pages.
www.amana.com, Refrigerator web pages, printed Aug. 9, 1999, date and author unknown, 2 pages.
www.amana.com, Refrigerator web pages, printed Aug. 23, 1999, date and author unknown, 3 pages.

* cited by examiner

GE Appliances

The dishwashers below matched your specific specifications of:

Built-In
White
6 - Variable wash cycles — 404

If you would like to refine your results, please answer a question at the left — 402

GE Profile Performance™

| Model No. | Wash Performance | | Delay Start | Dimensions | Est. Retail | Compare |
|---|---|---|---|---|---|---|
| GSD1910CSS | Quiet Pack | SureClean™ | Profile Performance™ | Yes | 31"h x 24"w x 241/4"d | $699 | ○ |
| GSD58400SS | SureClean™ | Profile Performance™ | Yes | 31"h x 24"w x 241/4"d | $699 | ○ |

GE Profile™

| Model No. | Wash Performance | | Delay Start | Dimensions | Est. Retail | Compare |
|---|---|---|---|---|---|---|
| GSD1330ZWW | Quiet Pack | SureClean™ | QuietPower™ III | Yes | 31"h x 24"w x 241/4"d | $469 | ○ |

GE™

| Model No. | Wash Performance | | Delay Start | Dimensions | Est. Retail | Compare |
|---|---|---|---|---|---|---|
| GSD3130ZWW | Quiet Pack | Standard | QuietPower™ | No | 31"h x 24"w x 251/8"d | $369 | ○ |

406 — GE Appliances

How many wash cycles would you like?
☐ 6 Variable
☐ 4 5
☐ 1

What type of wash performance would you like?
☐ SureClean™
☐ Standard

METHOD AND APPARATUS FOR PRODUCT SELECTION ASSISTANCE

BACKGROUND OF THE INVENTION

The present invention generally relates to product selection in an electronic commerce system, and in particular relates to product selection assistance using a product database in combination with a dynamically updating product matrix.

Electronic transactions occurring on the Internet have quickly become an established method of doing business. The Word Wide Web allows consumers to purchase products online using Web browsers such as Netscape Navigator™ and Internet Explorer™. Consumers seeking to purchase products on the Web access a company's web site, view the product information, select a product listed, and submit billing information in order to complete the purchase.

In the past, however, web sites offering on-line purchasing allowed only rudimentary product selection capabilities. For example, some web sites simply provided a listing of product numbers that allowed consumers to select the specific product to purchase. Other web sites grouped products into categories based on functions (e.g., hair dryers) and provided a categorical list of all the relevant products from which to select.

In other words, the past product selection techniques were very inflexible and generally unconcerned about what features, if any, a particular consumer found most important. With manufacturers offering so many permutations of product, features, color, and the like, the consumer was often presented with an overwhelming list of choices. In many cases, only simple hit or miss searching was available to guide the consumer to an appropriate product for purchase. Thus, past product selection systems were generally unable to focus the consumer on the product most desired, and thus did not generate as much on-line sales revenue as might otherwise have been obtained.

A need has long existed for a product selection assistance system that overcomes the problems noted above and other previously experienced.

BRIEF SUMMARY OF THE INVENTION

A preferred embodiment of the present invention provides a method for product selection assistance. The method includes the steps of receiving a product category selection, matching the product category selection against a product database to determine a plurality of matched products, and displaying a product matrix. The product matrix includes a product entry for each of the matched products. The product entries include a model identifier, a model price, and at least one product configuration parameter associated with the matched products. The method also includes the steps of presenting a product configuration question, receiving a product configuration answer, and responsively updating the product matrix based on the product configuration answer to eliminate at least one product entry in the product matrix.

A preferred embodiment of the present invention provides a product selection assistance tool. The assistance tool includes a communication interface, a processing circuit coupled to the communication interface, and a memory coupled to the processing circuit. The memory stores, for execution by the processing circuit, instructions for receiving a product category selection over the communication interface, matching the product category selection against a product database to determine a plurality of matched products, displaying a product matrix, presenting a product configuration question, receiving a product configuration answer, and responsively updating the product matrix based on the product configuration answer to eliminate at least one product entry in the product matrix.

A preferred embodiment of the present invention provides a product selection assistance Internet web page. The web page includes a matrix panel displaying a product matrix that describes products using individual product entries including a model identifier, a model price, and at least one product configuration parameter associated with the products. The web page also includes a product configuration panel displaying a product configuration question and accepting a product configuration answer. The product matrix on the web page responsively updates based on the product configuration answer to eliminate at least one product entry in the product matrix.

BRIEF DESCRIPTION OF THE DRAWINGS

FIG. 4 illustrates a product selection assistance web page included an updated product selection matrix.

DETAILED DESCRIPTION OF THE INVENTION

Figure 1:
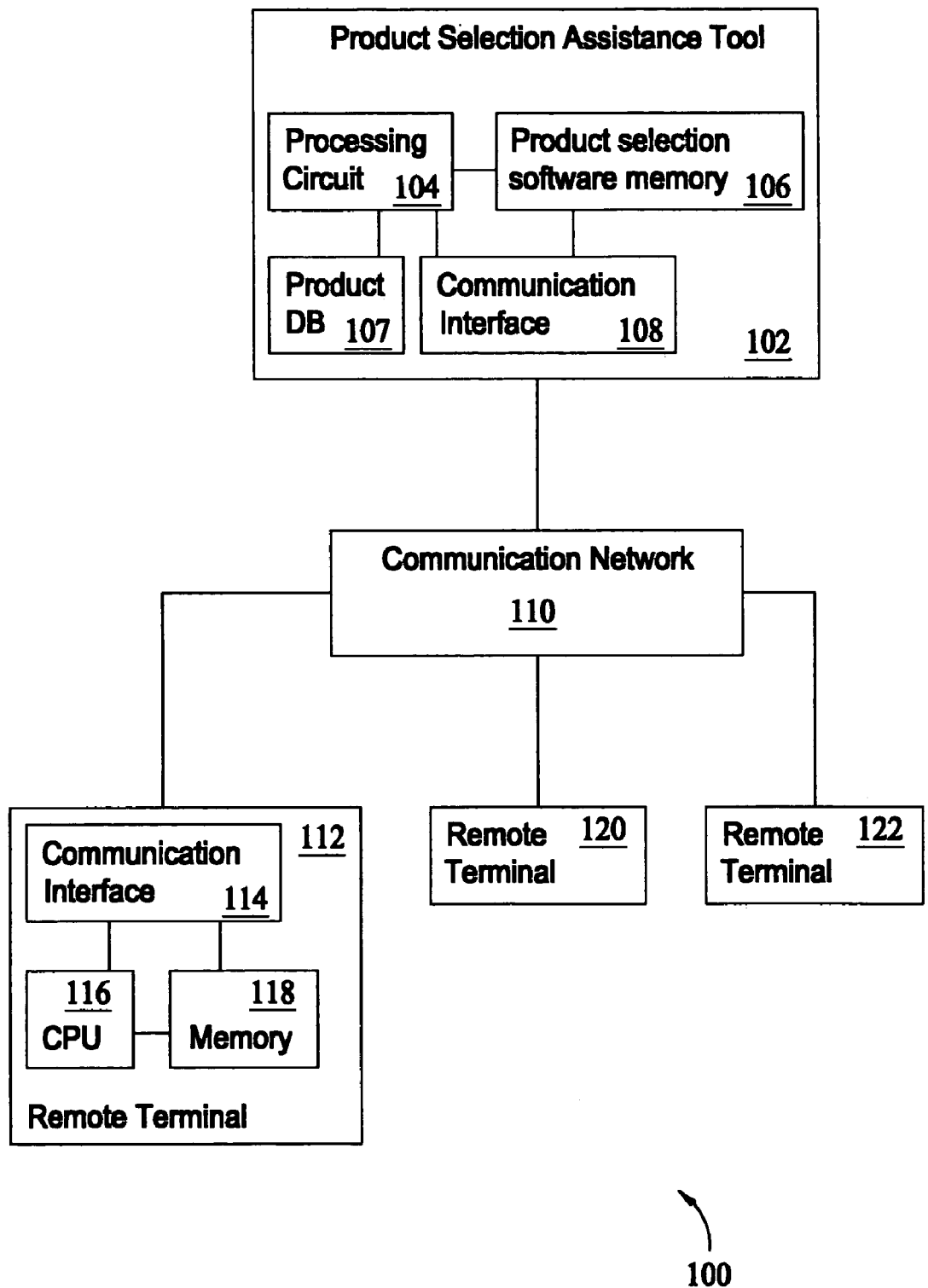
FIG. 1 illustrates a product selection assistance tool connected through a communication network to remote terminals.

Turning to FIG. 1, that figure illustrates a network configuration 100, including a product selection assistance tool 102. The product selection assistance tool 102 includes a processing circuit 104 interconnected with a product selection assistance software memory 106, a product database 107, and a communication interface 108. The product selection assistance software memory 106 is one example of a computer readable storage medium that stores instructions for execution by the processing circuit 104. The computer readable storage medium may be implemented, as examples, using a floppy disk, hard disk, magnetic tape, Read Only Memory (ROM), or Random Access Memory (RAM).

FIG. 1 also illustrates a communication network 110 that connects the product selection assistance tool 102 to a remote terminal 112. The remote terminal 112 includes a communication interface 114 interconnected with a processing circuit 116 and a general purpose memory 118. Additional remote terminals 120 and 122 are also connected through the communication network 110 to the product selection assistance tool 102.

The communication network 110 may represent, for example, Internet routing and switching functions, or may represent proprietary LAN or WAN networks. The communication interfaces 108 and 114 may be implemented, as examples, as network interface cards or modems, and may be hardwired or wireless. The processing circuits 104 and 116 may be general purpose CPUs, such as those in the Pentium™ line of processors. As will be explained in greater detail below, the product selection assistance software memory 106 stores instructions for execution by the processing circuit 104. The instructions allow the processing circuit 104 to assist remote users with selection of products using their remote terminals 112, 120, 122.

In the preferred embodiment, the remote terminals 112, 120, 122 represent personal computers connected over the Internet to the product selection assistance tool 102. To that end, the remote terminals 112, 120, 122 execute Internet browsing software, for example, Netscape Navigator™ or Microsoft Internet Explorer™. The product selection assistance tool 102 executes complimentary Internet web server and hosting software, thereby receiving, for example, initial product category selections from the remote terminals 112, 120, 122, and responsively presenting a dynamically updateable product matrix as explained in more detail below.

Figure 2:
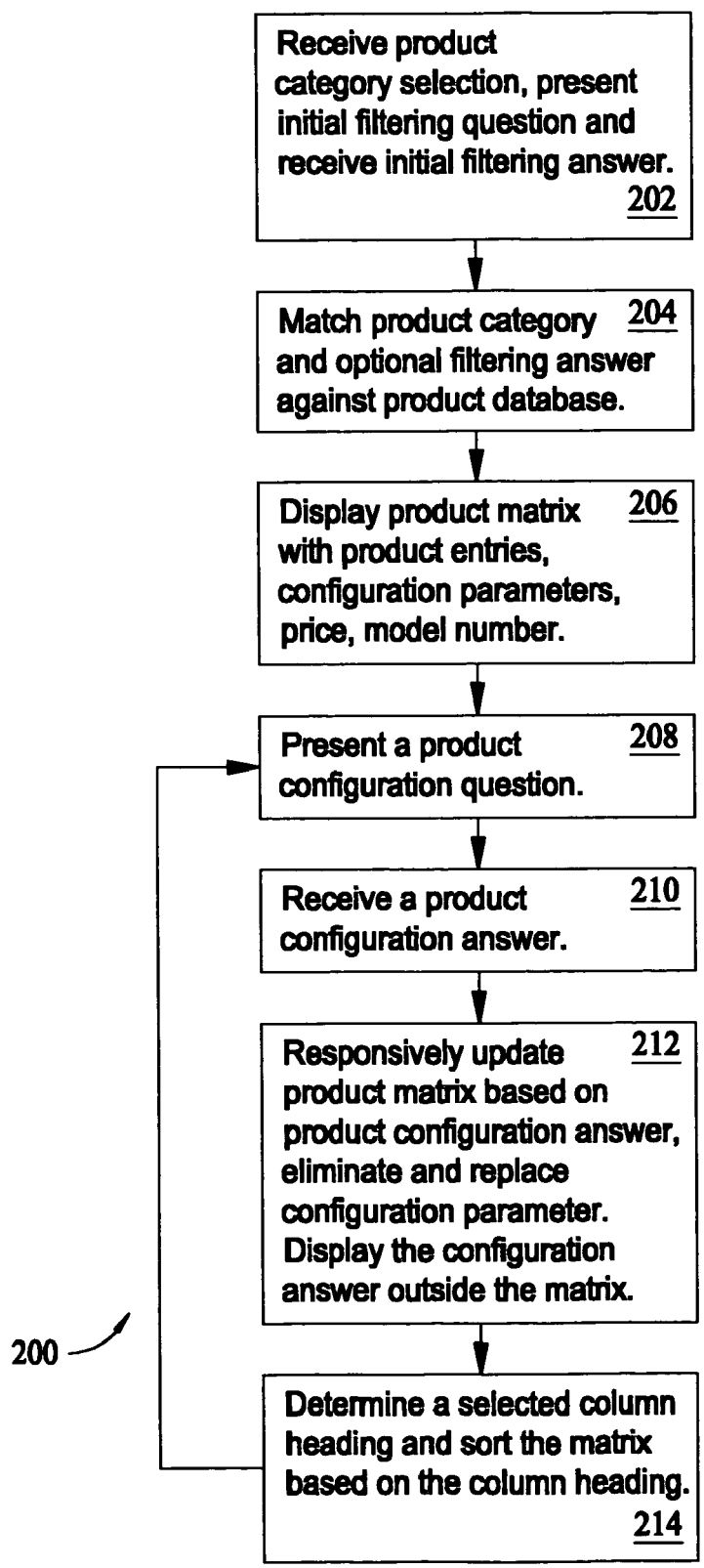
FIG. 2 shows a flow diagram for providing product selection assistance.

Turning now to FIG. 2, that figure shows a flow diagram 200 of the steps executed by the product selection assistance tool 102. At step 202, the product selection assistance tool 102 receives, over the communication interface 108 and communication network 110, a product category selection from a remote terminal 112, 120, 122. A product category selection preferably includes a high level product category (e.g., a refrigerator, air conditioner, or dish washer) for which many configuration options are available. The product category selection may also include a product color selection as an aid in initially reducing the numerous product choices available to the consumer. The product category selection may be made, for example, by clicking on a check box for off-white color, then clicking on an icon of a refrigerator.

At step 204, the processing circuit 104 matches the product category selection against the product database 107 to determine matched products. Then, at step 206, the processing circuit 104 generates a product matrix for display on a remote terminal 112, 120, 122. The product matrix includes a product entry for each of the matched products. Each product entry preferably includes a model identifier (e.g., a number, text label, or the like), a model price, and at least one product configuration parameter associated with the product. The product configuration parameters represent available product options (e.g., capacity or size, optional functionality, and the like). Preferably, the product configuration parameters are Critical-to-Quality (CTQ) parameters. A CTQ parameter is a configuration parameter that represents a configuration option of particular importance to a consumer (as determined through a consumer survey, for example). As one example, a CTQ parameter for a dishwasher is the number of rinse cycles that the dishwasher makes available. A set of exemplary product configuration parameters is presented below in Table 1.

TABLE 1

| Product Configuration Parameter | Product Configuration Question | Possible Product Configuration Answers |
|---|---|---|
| FREEZER TOP MOUNT REFRIGERATOR | | |
| Capacity | What capacity refrigerator do you need? | 9–13 Cu. Ft. 14–17 cu. Ft. 18–20 Cu. Ft. 21–25 Cu. Ft. |
| Dispenser | What type of dispenser would you like? | Cubed ice/water Crushed ice/cubed ice/water No dispenser |
| Icemaker installation | Would you like a factory installed icemaker? | Yes No |
| WASHERS | | |
| Capacity | What capacity washer do you need? | Super Extra-large Large |

TABLE 1-continued

| Product Configuration Parameter | Product Configuration Question | Possible Product Configuration Answers |
|---|---|---|
| | | Compact |
| Wash Cycles | How many wash cycles do you want? | 3–6 8–10 12–17 |
| Temperature and Rinse Combinations | How many wash temperatures and rinse combinations do you want? | 5 4 3 |
| DRYERS | | |
| Capacity | What capacity dryer do you need? | Super Extra-large Large Compact |
| Dry Cycles | How many dry cycles would you like? | 3–5 6–8 9–11 |
| Heat Selections | How many heat selections would you like? | 3 4 5 |
| ROOM AIR CONDITIONERS | | |
| BTUH Cooling | What BTUH cooling do you need? | 5,000–8,000 9,000–12,000 13,000–24,000 |
| Voltage | What voltage do you need? | 115 230/208 |
| Energy Efficiency | What energy efficiency ratio would you like? | 8.0–9.0 9.1–10.0 |

Any of the components of the product entry may be tagged as an Internet hyperlink to a dedicated product information page associated with that component. For example, the model number may be tagged as a hyperlink to a very detailed product information page for that particular model number.

Continuing at step 208, the processing circuit 104 presents a product configuration question to the consumer. The product configuration question generally relates to one or more of the product configuration parameters displayed in the product matrix. As an example, the product configuration question may ask the consumer how many rinse cycles the consumer desires a dishwasher to have, whether a refrigerator should provide filtered water, and the like. Subsequently at step 210, the processing circuit 104 receives a product configuration answer to the product configuration question. The product configuration answer generally narrows the number of applicable products and the processing circuit 104 then reevaluates the products displayed in the product matrix to eliminate non-applicable products. In other words, the processing circuit 104, in response to the product configuration answer, updates the product matrix based on the product configuration answer to eliminate at least one product entry in the product matrix (step 212). The product configuration question may be presented along with the possible application product configuration answers, each associated, for example, with a checkbox. The product configuration answer may then be indicated, or come in the form of, a checkbox selected by the consumer. The product configuration answer may also, however, come in the form of a more general numeric or text box entry.

The processing circuit 104 then preferably eliminates the product configuration parameter from the product matrix and may optionally insert additional product configuration parameters as replacements. For example, after the consumer provides a product configuration answer to the number of wash cycles desired, the product matrix updates to show only those washers meeting the product configuration answer. The processing circuit 104 may then insert a product configuration parameter related to an available fabric softener dispenser or wash spin and speed combinations. Furthermore, the number of wash cycles product configuration parameter is removed from the matrix, and is preferably (with the associated product configuration answer) displayed outside the matrix for continued reference.

At step 214, the processing circuit 104, determines whether the user has selected a column heading based on an external input (e.g., a mouse click, or keypress). If the user has selected a column heading, the processing circuit 104 proceeds by sorting the product matrix based on the selected column heading. The processing circuit 104 continues processing at step 208 until the all product configuration questions are exhausted, or until the consumer has narrowed the displayed products enough to make a selection.

Note that the consumer using the remote terminal 112, 120, 122 may perform a side by side comparison of products in the product matrix at any time. To this end, the product entries may include a toggle (e.g., ON/OFF) Compare button selectable by the consumer. When a Compare activator (e.g., a link, button, or the like) is selected, the processing circuit 104 responsively displays only the products selected by the consumer, preferably with expanded information on each product.

The product matrix preferably includes column headings that are selectable by the user, and that cause the product matrix to sort according to the selected column heading (e.g., price). A default sort by brand name may be initially imposed upon the product matrix. Column headings preferably provide descriptive indicia related to the product entries, including a model number heading, a model price heading, and a descriptive product configuration heading (e.g., Number of Wash Cycles) for each of the product configuration parameters.

In situations where the number of potentially applicable products is very large, the processing circuit 104 may present the consumer with an initial filtering question after receiving the product category selection and before matching the selection against a product database 107. The processing circuit 104 then receives an associated initial filtering answer and matches the product category selection and, for example, query criteria based on the initial filtering answer against the product database 107 to determine (generally fewer) matched products. As an example, the consumer may provide, as a product category selection, Red Trucks. The initial filtering question may then ask the consumer what make, what model, or what year to further narrow the number of applicable matched products.

As an example, assume that a user at a remote terminal 112, 120, 122 is searching for a refrigerator, preferably off-white. The consumer provides, as the product category selection, off-white refrigerators. The processing circuit 104 matches the product category selection against the product database 107. Those matching products are display using product entries in the product matrix. The processing circuit 104 then presents the user at the remote terminal 112, 120, 122 with a product configuration question, for example, the desired refrigerator capacity, type of dispenser, and ability to filter water. In response, the consumer provides a product configuration answer to each product configuration question and the processing circuit 104 updates the product matrix so that it displays only the applicable refrigerators found in the product database 107. As each product configuration question is asked and answered, the product entries in the product matrix are progressively narrowed until the consumer has found precisely the refrigerator desired: an off-white, side-by-side freezer, 28–30 cubic feet refrigerator with a cubed ice/water dispenser and filtered water. As an option, the consumer may order the product on-line through the product selection assistance system 100 by providing appropriate billing, address, and shipping information.

Figure 3:
FIG. 3 illustrates a product selection assistance web page including a product selection matrix.

Turning now to FIG. 3, that figure illustrates a product selection assistance web page 300. The web page 300 includes a matrix panel 302 that displays a product matrix 304 with product entries 306. The product entries 306 include a model number 308, a model price 310, and product configuration parameters 312, 314, and 316 associated with the products. Note that fewer than all possible product configuration parameters are generally displayed in order to avoid overwhelming the consumer with options. However, while three product configuration parameters 312, 314, and 316 are shown in the product matrix 304, greater or fewer may also be displayed simultaneously. The web page 300 also includes a product configuration panel 318 that displays a product configuration question 320 and that accepts a product configuration answer 322. As illustrated, the product configuration answers 322 take the form of toggle button input.

For side-by-side comparisons, the product matrix 304 also displays comparison toggle buttons 324 in each product entry 306. To that end, the product matrix 304 also provides a Compare link 326 that when activated by the consumer, instructs the processing circuit 104 to display side-by-side only those product with comparison toggle buttons in the ON state. As noted above, column headings 328 provide descriptive indicia of the information in each column, and are preferably formatted as active links that when selected, cause the processing circuit 104 to sort the matrix according to the data associated with the column heading. In addition, any of the information presented on the web page 300 may be formatted as a hyperlink to a detailed information page. Thus, for example, the model numbers may be hyperlinks selectable to jump to a detailed information page for that particular model.

As noted above, the product matrix 304 responsively updates based on the product configuration answer 322 to eliminate at least one product entry 306 in the product matrix 304. It is further noted that the product configuration parameters 312, 314, and 316 may be formatted as hyperlinks to product configuration informational pages with detailed descriptions of the associated product configuration parameter.

Turning now to FIG. 4, the figure illustrates a product selection assistance web page 400, after the processing circuit 104 has received a product configuration answer and updated the product matrix 304. Note that the product matrix 304 no longer displays the product configuration parameter relating to wash cycles. Rather, the wash cycles configuration parameter is replaced with a Wash Performance configuration parameter 402. In addition, the processing circuit 104 has removed the products that do not match the product configuration answer (6—Variable wash cycles). For example, the processing circuit 104 has updated the product matrix 304 to eliminate the product entry for model number GSD4030ZWW (as that model only provides 4 wash cycles).

The processing circuit 104 also displays, outside the product matrix 304, the configuration parameter remove from the product matrix 304. Namely, the wash cycles configuration parameter and configuration answer 404 are present outside the product matrix 304. Note also that the initial product category selection 406 is displayed outside the matrix as well.

The processing circuit 104, after updating the product matrix 304, presents a new product configuration question 408. In addition, the processing circuit 104 displays appropriate product configuration answers 410 and provides convenient toggle buttons with which the consumer can provide the product configuration answer. The product matrix may be updated dynamically in this fashion to continuously narrow the number of applicable products, and to quickly allow the consumer to home in on the desired purchase.

Thus the present invention provides a flexible and feature focused product selection assistance tool. The product selection assistance tool handles the enormous variety in product features, colors, and the like that manufacturers offer, interacts with the consumer to determine critical to quality product configuration answers, and responsively displays only those products meeting the product configuration answers. As a result, the present product selection assistance tool focuses the consumer on the product most desired, and helps generate additional on-line sales.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A computer-implemented method for product selection assistance, said method comprising:
   receiving a product category selection;
   processing the received product category selection using the computer by matching the product category selection against a product database to determine a plurality of matched products;
   displaying a product matrix comprising a product entry for each of the matched products, each product entry defining a row of the product matrix and comprising a model identifier and at least one product configuration parameter associated with the matched products such that the product matrix includes a product parameter column for each of the at least one product configuration parameters;
   presenting a product configuration question relating to the at least one product configuration parameter displayed in the product matrix, wherein said presenting the product configuration question comprises presenting the product configuration question associated with a selected product configuration parameter chosen from the at least one product configuration parameter;
   receiving a product configuration answer;
   processing the product configuration answer using the computer by responsively updating the product matrix based on the product configuration answer to eliminate at least one product entry in the product matrix, wherein said processing the product configuration answer by responsively updating comprises removing the selected product configuration parameter from the product matrix and displacing the selected product configuration parameter and the product configuration answer to a visible location outside the product matrix;
   modifying the product matrix by inserting another product parameter that defines a corresponding product parameter column to replace the selected product configuration parameter and corresponding column without changing a total number of parameter columns; and
   displaying the updated product matrix, the previous product configuration question, and a new product configuration question in a same display page.

2. A method according to claim 1, wherein each product entry further comprises a comparison toggle button with a selected state and an unselected state, and further comprising the steps of displaying a Compare button and, when the Compare button is activated, responsively displaying a side by side comparison only of matched products with the comparison toggle button in the selected state.

3. A method according to claim 1, wherein the step of receiving a product category selection further comprises receiving a product color.

4. A method according to claim 1, wherein the model identifier is formatted as a hyperlink to a product information page associated with the model identifier.

5. A method according to claim 1, wherein the step of displaying a product matrix further comprises displaying column headings in the product matrix including a model number heading, a model price heading, and a product configuration heading for each of the at least one product configuration parameter.

6. A method according to claim 5, further comprising the steps of determining a selected column heading based on an external input and sorting the product matrix based on the selected heading.

7. A method according to claim 1, wherein the at least one product configuration parameter includes a plurality of product configuration parameters, and at least one of the product configuration parameters is formatted as a hyperlink to a product configuration information page associated with the model identifier.

8. A method according to claim 1, further comprising the steps of, after receiving the product category selection, presenting an initial filtering question and receiving an associated initial filtering answer, and wherein the step of processing the received product category selection using the computer by matching comprises matching the product category selection and a query criteria based on the initial filtering answer against the product database to determine the plurality of matched products.

9. A method according to claim 1, wherein the step of displaying a product matrix further comprises displaying the at least one product entry sorted by brand name.

10. A method according to claim 1, wherein the at least one product configuration parameter is a consumer critical-to-quality parameter for the matched products.

11. A method according to claim 1, wherein each of the product configuration question and the product configuration answer include information regarding at least one of a refrigerator, a washer, a dryer, and an air conditioner.

12. A method according to claim 1, wherein the at least one product configuration parameter includes at least one of a capacity of a refrigerator, a type of dispenser included with the refrigerator, and inclusion of an icemaker with the refrigerator.

13. A method according to claim 1, wherein the at least one product configuration parameter includes at least one of a capacity of a washer, a number of wash cycles executed by the washer, and a number of combinations of wash temperatures and rinses executed by the washer.

14. A method according to claim 1, wherein the at least one product configuration parameter includes at least one of an amount of cooling provided by an air conditioner, an operating voltage of the air conditioner, and an energy efficiency ratio of the air conditioner.

15. A product selection assistance tool comprising:
a communication interface;
a processing circuit coupled to the communication interface; and
a memory coupled to the processing circuit, the memory storing, for execution by the processing circuit, instructions for:
receiving a product category selection over the communication interface;
matching the product category selection against a product database to determine a plurality of matched products;
displaying a product matrix comprising a product entry for each of the matched products, each product entry defining a row of the product matrix and comprising a model identifier and at least one product configuration parameter associated with the matched products such that the product matrix includes a product parameter column for each of the at least one product configuration parameters;
presenting a product configuration question related to the at least one product configuration parameter displayed in the product matrix;
receiving a product configuration answer;
responsively updating the product matrix based on the product configuration answer to eliminate at least one product entry in the product matrix, the product configuration question based on a selected product configuration parameter chosen from the at least one product configuration parameter, wherein the instructions for responsively updating include instructions to remove the selected product configuration parameter from the product matrix and instructions for displacing the selected product configuration parameter and the product configuration answer to a visible location outside the product matrix;
modifying the product matrix by inserting another product parameter that defines a corresponding product parameter column to replace the selected product configuration parameter and corresponding column without changing a total number of parameter columns; and
displaying the updated product matrix, the previous product configuration question, and a new product configuration question in a same display page.

16. A product selection assistance tool according to claim 15, wherein the at least one product configuration parameter includes product configuration parameters and at least one of the product configuration parameters is a hyperlink to a product configuration information page associated with the model identifier.

17. A product selection assistance tool according to claim 15, wherein the at least one product configuration parameter is a consumer critical-to-quality parameter for the matched products.

18. The product selection assistance tool of claim 15, wherein each of the product configuration question and the product configuration answer include information regarding at least one of a refrigerator, a washer, a dryer, and an air conditioner.

19. The product selection assistance tool of claim 15, wherein the at least one product configuration parameter includes at least one of a capacity of a refrigerator, a type of dispenser included with the refrigerator, and inclusion of an icemaker with the refrigerator.

20. The product selection assistance tool of claim 15, wherein the at least one product configuration parameter includes at least one of a capacity of a washer, a number of wash cycles executed by the washer, and a number of combinations of wash temperatures and rinses executed by the washer.

21. The product selection assistance tool of claim 15, wherein the at least one product configuration parameter includes at least one of an amount of cooling provided by an air conditioner, an operating voltage of the air conditioner, and an energy efficiency ratio of the air conditioner.

22. A computer comprising:
a processing circuit; and
a memory coupled to said processing circuit, wherein said memory stores, for execution by said processing circuit, instructions for:
displaying, on at least one of said computer and another computer connected to said computer over a network, a matrix panel comprising a product matrix displaying a plurality of products using individual product entries defining a row of the product matrix and comprising a model identifier and at least one product configuration parameter associated with the products such that the product matrix includes a product parameter column for each of the at least one product configuration parameters;
displaying, on at least one of said computer and the other computer, a product configuration panel displaying a product configuration question and accepting a product configuration answer, the product matrix responsively updating based on the product configuration answer to eliminate at least one product entry in the product matrix, wherein the product configuration question relates to the at least one product configuration parameter displayed in the product matrix, the product configuration question based on a selected product configuration parameter chosen from the at least one product configuration parameter, and wherein the product matrix is responsively updated by removing the selected product configuration parameter from the product matrix and by displacing the selected product configuration parameter and the product configuration answer to a visible location outside the product matrix;
modifying the product matrix by inserting another product parameter that defines a corresponding product parameter column to replace the selected product configuration parameter and corresponding column without changing a total number of parameter columns; and
displaying, on at least one of said computer and the other computer, the updated product matrix, the previous product configuration question, and a new product configuration question in a same display page.

23. A computer according to claim 22, wherein the product matrix further comprises column headings including a model number heading, a model price heading, and a product configuration heading for the at least one product configuration parameter.

24. A computer according to claim 22, wherein the product matrix displays the at least one product entry sorted according to a selected column heading.

25. A computer according to claim 22, wherein the at least one product configuration parameter includes product configuration parameters and at least one of the product configuration parameters is a hyperlink to a product configuration information page associated with the model identifier.

26. A computer according to claim 22, wherein the product configuration panel further displays outside the product matrix each product configuration answer.

27. A computer according to claim 22, wherein each product entry includes a comparison toggle button with an ON state and an OFF state.

28. A computer according to claim 22, wherein each of the product configuration question and the product configuration answer include information regarding at least one of a refrigerator, a washer, a dryer, and an air conditioner.

29. A computer according to claim 22, wherein the at least one product configuration parameter includes at least one of a capacity of a refrigerator, a type of dispenser included with the refrigerator, and inclusion of an icemaker with the refrigerator.

30. A computer according to claim 22, wherein the at least one product configuration parameter includes at least one of a capacity of a washer, a number of wash cycles executed by the washer, and a number of combinations of wash temperatures and rinses executed by the washer.

31. A computer according to claim 22, wherein the at least one product configuration parameter includes at least one of an amount of cooling provided by an air conditioner, an operating voltage of the air conditioner, and an energy efficiency ratio of the air conditioner.

32. A computer program product comprising:
a storage medium readable by a processing circuit and storing for execution by the processing circuit:
instructions for receiving a product category selection;
instructions for matching the product category selection against a product database to determine a plurality of matched products;
instructions for displaying a product matrix comprising a product entry for each of the matched products, each product entry defining a row of the product matrix and comprising a model identifier and at least one product configuration parameter associated with the matched products such that the product matrix includes a product parameter column for each of the at least one product configuration parameters;
instructions for presenting a product configuration question related to the at least one product configuration parameter displayed in the product matrix, wherein said instructions for presenting include instructions configured to present the product configuration question associated with a selected product configuration parameter chosen from the at least one product configuration parameter;
instructions for receiving a product configuration answer;
instructions for responsively updating the product matrix based on the product configuration answer to eliminate at least one product entry in the product matrix, wherein the instructions for responsively updating include instructions configured to remove the selected product configuration parameter from the product matrix and instructions configured to displace the selected product configuration parameter and the product configuration answer to a visible location outside the product matrix;
instructions for modifying the product matrix by inserting another product parameter that defines a corresponding product parameter column to replace the selected product configuration parameter and corresponding column without changing a total number of parameter columns; and
instructions for displaying the updated product matrix, the previous product configuration question, and a new product configuration question in a same display page.

33. The computer program product of claim 32, wherein the storage medium is one of a floppy disk, hard disk, ROM, or RAM.

34. The computer program product of claim 32, wherein each product entry further comprises a comparison toggle button with a selected state and an unselected state, and further instructions for displaying a Compare button and, when the Compare button is activated, responsively displaying a side by side comparison only of matched products having the comparison toggle button in the selected state.

35. The computer program product of claim 32, wherein each of the product configuration question and the product configuration answer include information regarding at least one of a refrigerator, a washer, a dryer, and an air conditioner.

36. The computer program product of claim 32, wherein the at least one product configuration parameter includes at least one of a capacity of a refrigerator, a type of dispenser included with the refrigerator, and inclusion of an icemaker with the refrigerator.

37. The computer program product of claim 32, wherein the at least one product configuration parameter includes at least one of a capacity of a washer, a number of wash cycles executed by the washer, and a number of combinations of wash temperatures and rinses executed by the washer.

38. The computer program product of claim 32, wherein the at least one product configuration parameter includes at least one of an amount of cooling provided by the air conditioner, an operating voltage of an air conditioner, and an energy efficiency ratio of the air conditioner.

* * * * *